United States Patent
Fassbender et al.

(10) Patent No.: US 9,061,608 B2
(45) Date of Patent: Jun. 23, 2015

(54) DETENT FITTING FOR LOCKING TWO VEHICLE PARTS

(75) Inventors: Frank Fassbender, Coburg (DE); Oliver Steffen, Coburg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 274 days.

(21) Appl. No.: 13/635,374

(22) PCT Filed: Mar. 10, 2011

(86) PCT No.: PCT/DE2011/000244
§ 371 (c)(1),
(2), (4) Date: Oct. 26, 2012

(87) PCT Pub. No.: WO2011/113416
PCT Pub. Date: Sep. 22, 2011

(65) Prior Publication Data
US 2013/0051899 A1    Feb. 28, 2013

(30) Foreign Application Priority Data

Mar. 15, 2010 (DE) .......................... 10 2010 002 868

(51) Int. Cl.
*F16C 11/00* (2006.01)
*B60N 2/235* (2006.01)

(52) U.S. Cl.
CPC ....... *B60N 2/2356* (2013.01); *Y10T 403/32262* (2015.01); *Y10T 403/32361* (2015.01)

(58) Field of Classification Search
CPC .................................................... B60N 2/2356
USPC ............. 403/83, 84, 86, 91, 92, 96; 297/366, 297/367 L, 367 R
See application file for complete search history.

(56) References Cited

U.S. PATENT DOCUMENTS 6,325,458 B1 * 12/2001 Rohee et al. .............. 297/367 R
6,454,354 B1    9/2002 Vossmann et al.
(Continued)

FOREIGN PATENT DOCUMENTS

CN    1264655 A    8/2000
CN    1785710 A    6/2006
(Continued)

OTHER PUBLICATIONS

English translation of the International Preliminary Report on Patentability for PCT/DE2011/000244, dated Mar. 26, 2013, 6 sheets.
(Continued)

*Primary Examiner* — Daniel P Stodola
*Assistant Examiner* — Jonathan Masinick
(74) *Attorney, Agent, or Firm* — Christie, Parker & Hale, LLP

(57) ABSTRACT

A detent fitting for latching two vehicle parts is provided. The detent fitting comprising a first fitting part, a second fitting part rotatably arranged about an axis of rotation relative to the first fitting part, at least one locking bolt shiftably arranged on the first fitting part, which is formed and provided to be brought in engagement with a toothing of the second fitting part for latching the first fitting part and the second fitting part and to be brought out of engagement with the toothing of the second fitting part for releasing the latching, at least one guide element arranged on the first fitting part for guiding the at least one locking bolt, and at least one bearing element arranged on the first fitting part and different from the at least one guide element, which for supporting the first fitting part on the second fitting part slidingly cooperates with the second fitting part.

11 Claims, 4 Drawing Sheets

(56) References Cited

U.S. PATENT DOCUMENTS

| | | | |
|---|---|---|---|
| 6,554,361 B2 | 4/2003 | Reubeuze et al. | |
| 6,561,585 B2 * | 5/2003 | Cilliere et al. | 297/367 R |
| 7,380,882 B2 * | 6/2008 | Oki | 297/367 R |
| 7,604,296 B2 * | 10/2009 | Yamada | 297/367 P |
| 2001/0001220 A1 * | 5/2001 | Rohee et al. | 297/367 |
| 2002/0053825 A1 | 5/2002 | Reubeuze et al. | |
| 2009/0302658 A1 * | 12/2009 | Fassbender et al. | 297/367 P |
| 2010/0319482 A1 * | 12/2010 | Fassbender et al. | 74/577 R |
| 2011/0062760 A1 * | 3/2011 | Zellmann et al. | 297/367 R |
| 2011/0101756 A1 * | 5/2011 | Fassbender et al. | 297/367 R |

FOREIGN PATENT DOCUMENTS

| | | |
|---|---|---|
| CN | 101277842 A | 10/2008 |
| DE | 199 04 300 C1 | 8/2000 |
| DE | 101 51 470 A1 | 5/2002 |
| DE | 10 2008 061 147 A1 | 6/2010 |
| EP | 1 066 170 B1 | 1/2001 |
| JP | 2000-4970 A | 1/2000 |
| JP | 2000-102440 A | 4/2000 |
| JP | 2000-270950 A | 10/2000 |
| JP | 2001-157615 A | 6/2001 |
| WO | WO 2009/036930 A2 | 3/2009 |

OTHER PUBLICATIONS

English translation of Chinese Office action for Application No. 201180014360.1, dated Nov. 25, 2014, 4 sheets.

* cited by examiner

DETENT FITTING FOR LOCKING TWO VEHICLE PARTS

CROSS-REFERENCE TO A RELATED APPLICATION

This application is a National Phase Patent Application of International Patent Application Number PCT/DE2011/000244, filed on Mar. 10, 2011, which claims priority of German Patent Application Number 10 2010 002 868.1, filed on Mar. 15, 2010.

BACKGROUND

This invention relates to a detent fitting for latching two vehicle parts.

Such detent fitting includes a first fitting part, a second fitting part rotatably arranged about an axis of rotation relative to the first fitting part, and at least one locking bolt movably arranged on the first fitting part. The locking bolt is formed and provided for latching the first fitting part and the second fitting part, in order to be brought in engagement with a toothing of the second fitting part and due to the engagement non-rotatably hold the first fitting part relative to the second fitting part. To release the latching, the at least one locking bolt can be brought out of engagement with the toothing of the second fitting part, so that the first fitting part and the second fitting part can be rotated relative to each other.

Such detent fittings are used for example in a seat adjuster of a vehicle, for example in a tilt adjuster of a backrest, in which the detent fitting in a latched condition holds the backrest relative to the seat part of a vehicle seat and is released for adjusting the backrest, so that the backrest can be pivoted relative to the seat part.

A detent fitting known from DE 199 04 300 C1 includes two locking bolts shiftably arranged on a first fitting part, which each have a toothing which can be brought in engagement with a toothing of a second fitting part rotatably mounted relative to the first fitting part. Via elevations axially protruding from the first fitting part, the two locking bolts on the first fitting part on the one hand are guided, and on the other hand the first fitting part is supported in a cutout of the second fitting part.

A detent fitting of this type holds two vehicle parts in position relative to each other due to the fact that one or more locking bolts which are arranged on the first fitting part are in engagement with the second fitting part, so that the first fitting part is latched relative to the second fitting part and a vehicle part connected with the first fitting part is locked relative to a vehicle part connected with the second fitting part. A fundamental requirement in such detent fitting consists in that the detent fitting must safely hold the vehicle parts even with great loads occurring as a result of an accident, in order to avoid a sudden and abrupt displacement of the one vehicle part relative to the other vehicle part and eliminate a related risk of injury.

SUMMARY

It is the object underlying the present invention to create a detent fitting which even with a simple and inexpensive manufacture can safely absorb loads caused by an accident.

According to an exemplary embodiment of the invention are provided at least one guide element arranged on the first fitting part for guiding the at least one locking bolt, and at least one bearing element arranged on the first fitting part and different from the at least one guide element, which for supporting the first fitting part on the second fitting part slidingly cooperates with the second fitting part.

The at least one guide element and the at least one bearing element are formed as raised portions axially protruding from a base body of the first fitting part in direction of the axis of rotation, wherein the at least one guide element has another height above the base body than the at least one bearing element.

The present invention proceeds from the idea to on the one hand provide one or more guide elements for shiftably guiding one or more locking bolts on the first fitting part and on the other hand provide one or more bearing elements for supporting the first fitting part on the second fitting part. The guide elements and the bearing elements are different from each other: The guide elements serve for guiding the locking bolts, but not for supporting the first fitting part; the bearing elements, however, serve for supporting the first fitting part on the second fitting part, but not for guiding the locking bolts.

The at least one bearing element and the at least one guide element are formed as raised, separate portions axially protruding from the base body of the first fitting part in direction of the axis of rotation. In this way, the support of the first fitting part on the second fitting part and the guidance of one or more locking bolts on the first fitting part are functionally separated. Due to this functional separation it becomes possible to form the different elements—namely the at least one guide element on the one hand and the at least one bearing element on the other hand—in different ways and to in particular assign them different heights above the base body of the first fitting part. The height of the respective elements hence can be adapted to the strength requirements in the guidance of the locking bolts on the one hand and in the support of the first fitting part on the second fitting part on the other hand, in order to be able to suitably absorb forces in a load case.

Advantageously, the at least one guide element has a smaller height above the base body than the at least one bearing element. When the at least one guide element and the at least one bearing element are formed as insertion tabs axially molded into the base body (e.g. by shaping the base body by using a punch), it can be achieved in this way that the guide element has a larger so-called residual connection to the base body than the bearing element, i.e. due to the smaller height, the (material) connection of the guide element with the base body is more massive and stronger than for the bearing element.

The background here is that for manufacturing an insertion tab for forming the guide element or the bearing element a punch is attached from one side to the base body extending flat and in a plate-shaped manner and is formingly pushed into the base body, in order to form the guide element or the bearing element on the other side of the base body, i.e. push the same out, in other words "put the same through". The smaller the height of the raised portion thus formed, the stronger the still existing connection to the base body (the so-called "residual connection").

Due to the fact that in the present case the guide element has a smaller height than the bearing element, the guide element has a greater residual connection and in case of a crash, in which the guide element is subject to a particularly high load due to the force acting on the locking bolts, thus can absorb greater forces without the guide element being sheared off.

Due to the fact that the at least one guide element and the at least one bearing element are functionally separately formed as separate raised portions of the base body, it becomes possible to form the guide element and the bearing element with different heights. In this way, the guide element can be formed with a comparatively small height for absorbing the acting forces and the bearing element can be formed with a comparatively large height for the advantageous, large-surface support of the first fitting part on the second fitting part with an advantageous surface pressure.

For supporting the first fitting part on the second fitting part, the first fitting part includes one or more bearing elements which for support slidingly rest against the second fitting part. The toothing of the second fitting part for example can be formed in a cutout of the second fitting part as an internal toothing extending around a ring-shaped portion, wherein the bearing elements arranged on the first fitting part and protruding into the cutout rest against the toothing of the second fitting part for a sliding support. For this purpose, the at least one bearing element slidingly cooperates with the toothing of the second fitting part via a curved bearing portion for the rotatable support of the first fitting part on the second fitting part, wherein the height of the at least one bearing element above the base body corresponds to the height of the bearing portion. Due to the fact that the bearing portion is formed with a comparatively large height, an advantageous radial guidance is created via the bearing elements on the internal toothing of the second fitting part with a comparatively small surface pressure relative to the internal toothing of the second fitting part.

In an advantageous aspect, an additional toothing is provided on at least one of the guide elements stationarily arranged on the first fitting part, which in normal operation of the detent fitting and the normal load forces acting thereby has no influence on the operation of the detent fitting, but upon occurrence of high loads as a result of an accident gets in engagement with the toothing on the second fitting part and thus establishes an additional latching of the first fitting part with the second fitting part. Due to the additional latching, the first fitting part is safely and reliably held in position relative to the second fitting part even in an accident, so that a sudden, abrupt displacement of the first fitting part relative to the second fitting part is not possible or at least not easily possible.

In case of loads caused by an accident, the first fitting part thus is latched with the second fitting part in addition to the locking by the at least one locking bolt via the toothing formed on the at least one guide element, so that even when the engagement of the at least one locking bolt with the second fitting part is canceled, for example as a result of a deformation or a breakage of the locking bolt, the latching of the detent fitting is not canceled. By providing functionally different elements formed separately on the first fitting part to on the one hand guide the locking bolts and on the other hand support the first fitting part, the safety during an accident hence can be increased, in that the detent fitting also is safely latched even with the loads occurring during an accident. In addition, the fabrication of the first fitting part can be simplified by providing the different elements.

Via the at least one guide element arranged on the first fitting part, the at least one locking bolt is shiftably guided on the first fitting part radially to the axis of rotation. For example, each locking bolt can shiftably be arranged on the first fitting part via two guide elements, wherein the guide elements include radially extending guide portions along which the locking bolt is slidingly guided. Each guide element forms a portion stationarily arranged on the first fitting part, on which a toothing can each be arranged, which in case of a load acting on the detent fitting due to an accident can get in engagement with the toothing on the second fitting part to accomplish the additional latching.

The at least one guide element and/or the at least one bearing element preferably are at least partly deformable such that in case of a load caused by an accident the toothing on the at least one guide element gets in engagement with the toothing of the second fitting part. Due to the fact that one or more guide elements and/or one or more bearing elements are deformed upon occurrence of a load caused by an accident, the toothing of one or more guide elements gets in engagement with the toothing of the second fitting part and thus additionally latches the first fitting part with the second fitting part. The deformation of the guide elements for example can occur when the locking bolts on the first fitting part are slanted as a result of a load acting on the locking bolts circumferentially —i.e. rotatorily about the axis of rotation. The deformation of the bearing elements, however, preferably is effected from a load acting radially to the axis of rotation.

The deformation of the guide elements and/or bearing elements made of metal, for example, can be effected elastically or plastically, wherein in the first case the additional latching is effected in a non-destructive manner and in the second case in a destructive manner.

The toothing on the guide element advantageously is formed on a portion facing the toothing of the second fitting part, curved corresponding to the curvature of the toothing of the second fitting part, and in an operating condition of the detent fitting is spaced from the toothing of the second fitting part, so that in normal operation of the detent fitting the toothing of the guide elements is not in engagement with the toothing of the second fitting part. In the normal operating condition, the latching of the first fitting part with the second fitting part thus can be eliminated by releasing the engagement of the one or the more locking bolts with the toothing of the second fitting part, so that the first fitting part can be rotated relative to the second fitting part. In case of a load caused by an accident, however, one or more guide elements with their toothing get in engagement with the toothing of the second fitting part and thus additionally latch the detent fitting, so that in case of loads caused by an accident the latching of the detent fitting cannot easily be canceled.

The bearing elements and the guide elements can be arranged on the first fitting part such that a bearing element circumferentially is provided between two guide elements. Thus, an arrangement of (consecutively) guide element, bearing element, guide element, locking bolt, guide element, bearing element, guide element etc. is obtained in circumferential direction.

In a concrete exemplary configuration, three locking bolts arranged offset to each other by 120° are shiftably supported radially to the axis of rotation via two guide elements each. Thus, a total of six guide elements are provided, which on a portion each facing the toothing of the second fitting part carry a toothing. Furthermore, three bearing elements likewise offset to each other by 120° are provided on the first fitting part, which in normal operation of the detent fitting support the first fitting part on the second fitting part. The bearing elements can be offset to the locking bolts by 60°, so that the bearing elements are regularly spaced to the locking bolts in circumferential direction.

BRIEF DESCRIPTION OF THE DRAWINGS

The idea underlying the invention will be explained in detail below with reference to the exemplary embodiments illustrated in the Figures.

DETAILED DESCRIPTION

Figure 1:
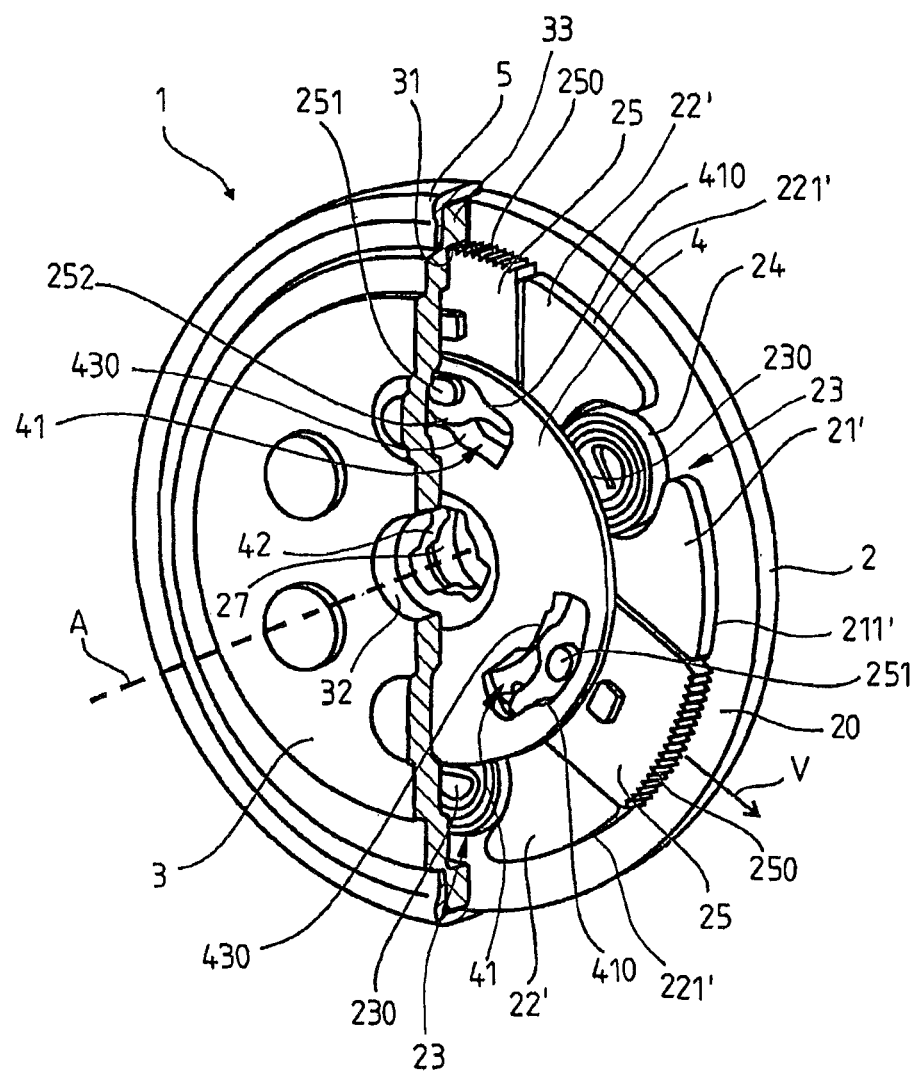
FIG. 1 shows a perspective partly sectional view of a detent fitting.

FIG. 1 shows a partly sectional, perspective view of an embodiment of a detent fitting 1, which can be used for example in a seat adjuster for adjusting the inclination of a backrest of a vehicle seat. Identically constructed detent fittings 1 are arranged offset to each other on both sides of the backrest axially along a swivel axis of the backrest and connected with each other via a drive shaft extending along an axis of rotation A. The detent fittings 1 serve for latching the backrest relative to a seat part of the vehicle seat and hold the backrest in position to the seat part. Via an actuating lever, the drive shaft connecting the detent fittings 1 with each other can be actuated, whereby the latching of the detent fittings 1 can be released and the backrest can be adjusted.

The detent fitting 1 shown in FIG. 1 includes a first fitting part 2, which is pivotally connected with a second fitting part 3 about the axis of rotation A via a retaining ring 5 clampingly arranged on the first fitting part 2. When used for latching a backrest, the first fitting part 2 for example can be connected with the seat part and the second fitting part 3 can be connected with the backrest, with the swivel axis between backrest and seat part corresponding to the axis of rotation A of the detent fitting 1.

For latching, three locking bolts 25 offset to each other by 120° around the axis of rotation A are arranged on the first fitting part 2, which via guide elements 21', 22' are shiftably supported on the first fitting part 2 in a radial adjustment direction V and for latching the detent fitting 1 can be brought in engagement with a toothing 31 of the second fitting part 3 formed as internal toothing on a ring-shaped portion 33 via an external toothing 250.

In the condition shown in FIG. 1, the locking bolts 25 are in a position shifted radially to the outside, in which their toothing 250 engages in the toothing 31 of the second fitting part 3. In this condition, the detent fitting 1 is latched, so that the first fitting part 2 cannot be pivoted relative to the second fitting part 3.

In the embodiment as shown in FIG. 1, the guide elements 21', 22' guiding the locking bolts 25 in radial direction are formed as raised portions protruding from a disk-shaped base body 20 in direction of the second fitting part 3 and on the one hand serve the radial guidance of the locking bolts 25 and on the other hand the support of the first fitting part 2 on the second fitting part 3. For this purpose, the outer portions 211', 221' of the guide elements 21', 22' slidingly rest against the toothing 31 of the second fitting part 3 formed as internal toothing, so that the first fitting part 2 is pivotable relative to the second fitting part 3 about the axis of rotation A.

The latching of the detent fitting 1 is accomplished via the locking bolts 25, which in the latched condition are in engagement with the toothing 31 of the second fitting part 3 via the toothings 250. The actuation of the locking bolts 25 for latching the detent fitting 1 or for releasing the latching is effected via a drive element 4 arranged between the first fitting part 2 and the second fitting part 3, which is formed disk-shaped and includes a central receiving opening 42 for accommodating a drive shaft reaching through the fitting parts 2, 3 on cutouts 27, 32.

On the drive element 4, identically constructed coulisses 41 offset to each other by 120° are formed around the axis of rotation A, into each of which an actuating element 251 of a locking bolt 25 engages. The actuating element 251 each rests against an outer coulisse portion 410 of the coulisse 41 and slides along the outer coulisse portion 410, when the drive element 4 is rotated about the axis of rotation A.

In addition a raised, protruding actuating disk is arranged on the back of the drive element 4, which on its outer circumference forms a guide portion 430 which via a cam 252 each formed at the lower end of the locking bolts 25 is in contact with the locking bolts 25 supported on the first fitting part 2.

In a latched condition, in which the locking bolts 25 are shifted radially to the outside and via their toothing 250 are in engagement with the toothing 31 of the second fitting part 3, so that the first fitting part 2 cannot be pivoted relative to the second fitting part 3, the actuating element 251 of the locking bolts 25 each is in abutment with a portion of the outer coulisse portion 410 radially offset to the outside, and at the same time the cam 252 of the locking bolts 25 each rests against a portion of the guide portion 430 likewise radially offset to the outside. Via the drive element 4, the locking bolts 25 thus are held in engagement with the toothing 31 of the second fitting part 3.

For actuating the locking bolts 25, the drive element 4 is pivoted about the axis of rotation A—in the view of FIG. 1 in anticlockwise direction. The actuating element 251 of each locking bolt 25 slides along the outer coulisse portion 410 of the respectively associated coulisse 41 and the cam 252 formed at the lower end of the locking bolt 25 slides along the guide portion 430, until the actuating element 251 comes in abutment with a portion of the outer coulisse portion 410 radially offset to the inside and the cam 252 comes in abutment with a portion of the guide portion 430 radially offset to the inside, and the locking bolt 25 thereby is shifted radially to the inside. In this unlocked condition, the locking bolts 25 then no longer are in engagement with the toothing 31 of the second fitting part 3, so that the first fitting part 2 is unlocked from the second fitting part 3 and can be pivoted about the axis of rotation A relative to the second fitting part 3.

As shown in FIG. 1, spring elements 24 are arranged on the first fitting part 2 in receptacles 23 and held on the first fitting part 2 via holding elements 230. The spring elements 24 bias the drive element 4 relative to the first fitting part 2 in direction of the latched condition as shown in FIG. 1, so that the detent fitting 1, when the drive element 4 is not actuated, holds the locking bolt 25 in the latched position and the first fitting part 2 is locked relative to the second fitting part 3.

Figure 2:
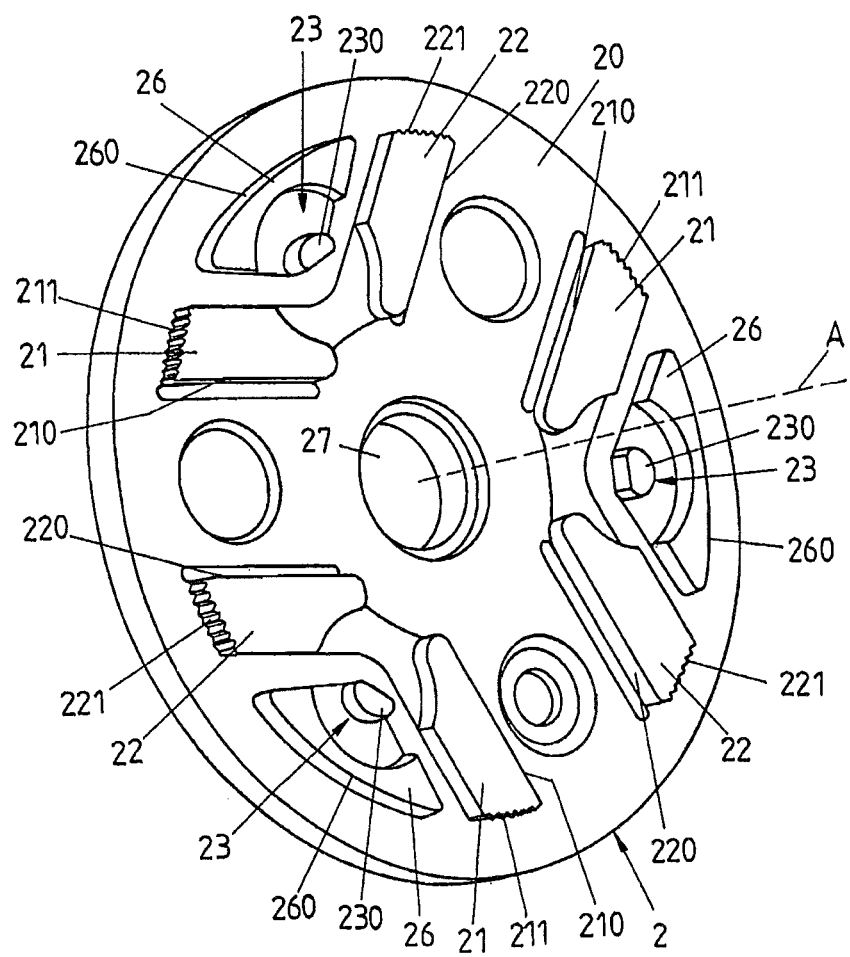
FIG. 2 shows a perspective view of an embodiment of a first fitting part of a detent fitting with guide elements and bearing elements arranged thereon.

FIG. 2 shows a perspective view of an embodiment of the first fitting part 2, in which guide elements 21, 22 for guiding one locking bolt 25 each (not shown in FIG. 2) and bearing elements 26 formed separate from the guide elements 21, 22 are provided. Apart from the configuration of the first fitting part 2, the construction and the mode of operation of the detent fitting using this modified first fitting part 2 corresponds to the detent fitting 1 shown in FIG. 1 and described above.

The guide elements 21, 22 each form latch guiding portions 210, 220 extending in pairs parallel to each other, between which the locking bolts 25 are guided. The first fitting part 2 is formed for accommodating a total of three locking bolts 25, so that the first fitting part 2 includes a total of six guide elements 21, 22.

The guide elements 21, 22 are formed as raised portions protruding in axial direction on a disk-shaped base body 20 of the first fitting part 2. Spatially separately, and as separate raised portions, three bearing elements 26 are provided, which are offset to each other by 120° and each include an outer curved bearing portion 260, which with mounted detent fitting 1 (see FIG. 1) slidingly rests against the toothing 31 of the second fitting part 3. Via the bearing elements 26, the first fitting part 2 is pivotally mounted relative to the second fitting part 3 about the axis of rotation A, and when the locking bolts 25 are not in engagement with the toothing 31 of the second fitting part 3, can be pivoted relative to the second fitting part 3.

The bearing elements 26 are offset to each other by 120° and to each of the adjacent locking bolts 26 by 60° and thus are arranged on the first fitting part 2 regularly spaced in circumferential direction about the axis of rotation A.

FIG. 2 also shows the receptacle 23 for the spring elements 24 formed in the region of the bearing elements 26 and the guide elements 21, 22 for biasing the drive element 4.

Figure 3:
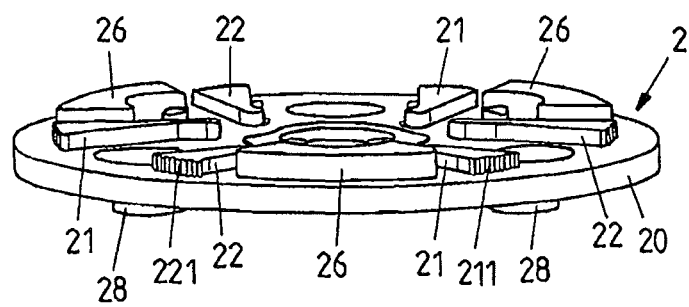
FIG. 3 shows a perspective view of an embodiment of a first fitting part of a detent fitting with guide elements and bearing elements arranged thereon.
Figure 4:
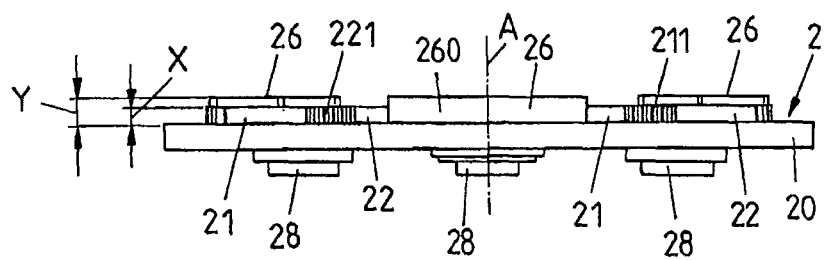
FIG. 4 shows a side view of the first fitting part as shown in FIG. 3 with bearing elements and guide elements of different height.

As illustrated in FIGS. 3 and 4, the bearing elements 26 and guide elements 21, 22 formed as insertion tabs have different heights X, Y above the base body 20. The bearing elements 26 have a comparatively large height Y, whereas the guide elements 21, 22 have a smaller height X and hence protrude less far from the base body 20 in axial direction in direction of the second fitting part 3.

The raised portions forming the bearing elements 26 and guide elements 21, 22 are formed by shaping. For manufacturing these raised portions, a tool in the form of a punch for example is pressed into the base body 20, in order to mold the raised portions into the base body 20.

Since the height X of the guide elements 21, 22 is smaller than the height Y of the bearing elements 26, the connection of the guide elements 21, 22 to the base body 20 is more firm than the connection of the bearing elements 26, due to the larger residual connection of the guide elements 21, 22 to the base body 20 with a smaller height. In this way, the guide elements 21, 22 safely and reliably can absorb the forces acting on the locking bolts 25 in circumferential direction (i.e. about the axis of rotation A) during a crash, without the guide elements 21, 22 being sheared off.

At the same time, the bearing portion 260 each provided at the bearing elements 26 has a large height Y, so that via the bearing portions 260 an advantageous radial bearing with a comparatively large bearing surface (corresponding to the surface of the bearing portions 260) and a correspondingly lower surface pressure to the internal toothing 31 of the second fitting part 3 is provided. Since the bearing elements 26 are loaded less in case of a crash than the guide elements 21, 22, a lower residual connection is sufficient as a result of the insertion tab with a large height Y for the bearing elements 26.

It is of course also possible to form the individual bearing elements 26 with different heights each and/or the individual guide elements 21, 22 with different heights each.

As shown in FIG. 4, fastening elements 28 for connecting the first fitting part 2 with a seat frame part are arranged on the back of the base body 20.

As shown in FIGS. 2 to 4, toothings 211, 221 each are formed on outer portions of the guide elements 21, 22, which are facing the toothing 31 of the second fitting part 3, but in the normal operating condition of the detent fitting 1 are not in engagement with the toothing 31 of the second fitting part 3. As described above, the locking of the detent fitting 1 in normal operation solely is effected via the locking bolts 25, which for latching the detent fitting 1 are brought in engagement with the toothing 31 of the second fitting part 3 or out of engagement with the toothing 31 for releasing the latching.

Figure 6A:
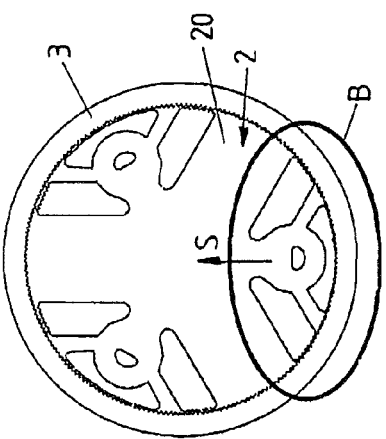
FIG. 6A shows a sectional view of the arrangement as shown in FIG. 5 under a load caused by an accident.
Figure 6B:
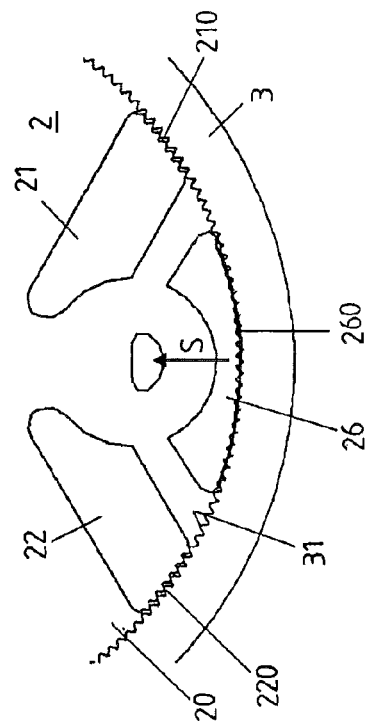
FIG. 6B shows the detail B from FIG. 6A on an enlarged scale.
Figure 5:
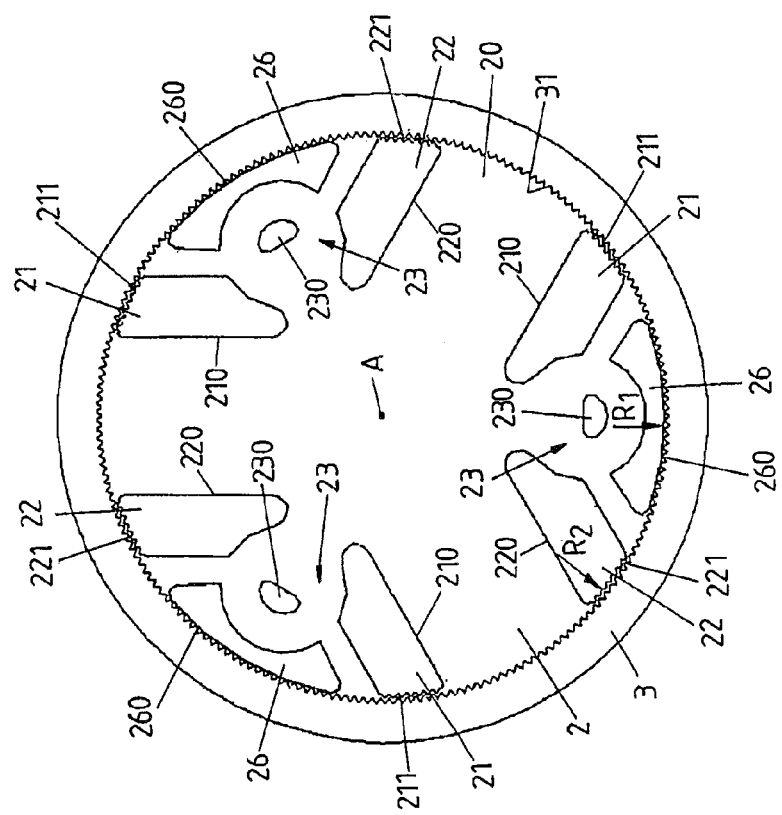
FIG. 5 shows a schematic sectional view of the first fitting part as shown in FIG. 2, supported on a second fitting part of a detent fitting.

FIGS. 5 and 6A, 6B show the first fitting part 2 as shown in FIG. 2 on the second fitting part 3. FIG. 5 here shows the normal operating condition, while FIGS. 6A and 6B show a condition upon occurrence of a high load, for example a load caused by an accident, and a resulting relative movement of the first fitting part 2 to the second fitting part 3 in a shifting direction S. FIG. 6B shows the detail B from FIG. 6A on an enlarged scale.

In normal operation, as shown in FIG. 5, the first fitting part 2 is slidingly supported on the toothing 31 of the second fitting part 3 formed as internal toothing via the bearing elements 26. In this condition, the toothings 211, 221 of the guide elements 21, 22 are not in engagement with the toothing 31 of the second fitting part 3—due to the fact that the toothings 211, 221 are offset radially to the inside with respect to the bearing portions 260 and have a smaller radius R2 about the axis of rotation A than the bearing portions 260 (radius R1)—, so that the first fitting part 2 can be pivoted relative to the second fitting part 3, when the locking bolts 25 are brought out of engagement with the toothing 31 of the second fitting part 3.

When, however, in particular as a result of a load caused by an accident and large forces occurring thereby, a relative movement occurs of the second fitting part 3 to the first fitting part 2 in the shifting direction S, due to a deformation of the bearing element 26 shown in FIGS. 6A and 6B at the bottom, the toothings 210, 220 of the guide elements 21, 22 framing the lower bearing element 26 get in engagement with the toothing 31 of the second fitting part 3, so that via the guide elements 21, 22 an additional latching of the first fitting part 2 relative to the second fitting part 3 is accomplished. This leads to the fact that even with large forces occurring during an accident, the detent fitting 1 is safely latched and a sudden, abrupt displacement of the fitting parts 2, 3 to each other is not or at least not easily possible.

The bearing elements 26 preferably are formed and dimensioned such that they are specifically deformed during an accident and thus provide for an engagement of one or more of the guide elements 21, 22 with the toothing 31 of the second fitting part 3. For this purpose, the height Y (see FIG. 4) of the bearing elements 26 can specifically be chosen for adjusting a desired residual connection and a connecting strength resulting therefrom.

The guide elements 21, 22 also can be formed such that the guide elements 21, 22 can get in engagement with the toothing 31 of the second fitting part 3, but at the same time a locking bolt 25 arranged on the opposite side of the first fitting part 2 (in FIG. 6A at the top) possibly does not get out of engagement with the toothing 31 of the second fitting part 3. The distance of the guide elements 21, 22 from the toothing 31 therefore should be dimensioned smaller than the distance which is required to bring a locking bolt 25 out of engagement with the toothing 31 of the second fitting part 3.

With another load caused by an accident, in which (possibly additional) forces act in circumferential direction, the guide elements 21, 22 also can at least partly be deformed, due to a slanting of the locking bolts 25. The deformability also can possibly be specified by choosing the height X of the guide elements 21, 22 and the resulting residual connection, wherein the height X of the guide elements 21, 22 is to be chosen smaller than the height Y of the bearing elements 26, in order to prevent shearing off of the guide elements 21, 22 even with large forces acting in circumferential direction in case of a crash.

The idea underlying the invention is not limited to the exemplary embodiments described above. In particular, the invention is also usable in detent fittings which include more or less than three locking bolts, for example two or four locking bolts. In addition, detent fittings of the type described can also be used in adjustment devices other than seat tilt adjusters.

The invention claimed is:

1. A detent fitting for latching two vehicle parts comprising:
   a first fitting part comprising a base body;
   a second fitting part rotatably arranged about an axis of rotation relative to the first fitting part;
   at least one locking bolt shiftably arranged on the first fitting part, which is formed and provided to be brought in engagement with a toothing of the second fitting part for latching the first fitting part and the second fitting part and to be brought out of engagement with the toothing of the second fitting part for releasing the latching;
   at least one guide element arranged on the base body of the first fitting part for guiding the at least one locking bolt; and
   at least one bearing element arranged on the base body of the first fitting part and different from the at least one guide element, the at least one bearing element comprising a bearing face which for supporting the first fitting part on the second fitting part is in sliding contact with the second fitting part;
   wherein the at least one guide element and the at least one bearing element are formed as raised portions axially protruding from the base body of the first fitting part along the direction of the axis of rotation;
   wherein the at least one guide element comprises a first height measured along the axis of rotation;
   wherein the bearing face of the at least one bearing element comprises a second height measured along the axis of rotation;
   wherein the first height is different than the second height.

2. The detent fitting according to claim 1, wherein the first height is smaller than the second height.

3. The detent fitting according to claim 1, wherein the at least one guide element and the at least one bearing element are formed as insertion tabs axially molded into the base body.

4. The detent fitting according to claim 1, wherein the toothing of the second fitting part is formed as internal toothing extending around a ring-shaped portion of the second fitting part.

5. The detent fitting according to claim 1, wherein the at least one bearing element slidingly cooperates with the toothing of the second fitting part via a curved bearing portion for rotatably supporting the first fitting part on the second fitting part.

6. The detent fitting according to claim 5, wherein on the at least one guide element a toothing is constituted to engage with the toothing of the second fitting part in case of a load caused by an accident.

7. The detent fitting according to claim 6, wherein at least one of the at least one guide element or the at least one bearing element are at least partly deformable such that in case of a load caused by an accident the toothing on the at least one guide element engages with the toothing of the second fitting part.

8. The detent fitting according to claim 6, wherein the toothing of the at least one guide element is formed on a curved portion of the at least one guide element facing the toothing of the second fitting part and in an operating condition of the detent fitting is spaced from the toothing of the second fitting part.

9. The detent fitting according to claim 1, wherein on the first fitting part one bearing element each is circumferentially arranged between two guide elements.

10. The detent fitting according to claim 1, wherein on the first fitting part
    three bearing elements offset to each other by 120°,
    six guide elements, and
    three locking bolts offset to each other by 120°, are arranged, wherein the locking bolts are shiftably guided on the first fitting part radially to the axis of rotation via two guide elements each.

11. The detent fitting according to claim 10, wherein the bearing elements each are arranged offset to an adjacent locking bolt by 60°.

* * * * *